United States Patent
Gulati et al.

(10) Patent No.: US 12,160,451 B2
(45) Date of Patent: Dec. 3, 2024

(54) GOVERNANCE AND SECURITY CONTROL FOR SERVICES EXECUTING ON CLOUD PLATFORMS

(71) Applicant: Salesforce, Inc., San Francisco, CA (US)

(72) Inventors: Aman Gulati, Sunnyvale, CA (US); Yifan Wang, Bothell, WA (US); Giridharan Sridharan, Bellevue, WA (US); Xuan Tao, Bothell, WA (US); Dongming Bi, Sammamish, WA (US)

(73) Assignee: Salesforce, Inc., San Francisco, CA (US)

( * ) Notice: Subject to any disclaimer, the term of this patent is extended or adjusted under 35 U.S.C. 154(b) by 254 days.

(21) Appl. No.: 17/983,316

(22) Filed: Nov. 8, 2022

(65) Prior Publication Data

US 2024/0155003 A1   May 9, 2024

(51) Int. Cl.
*H04L 9/40*   (2022.01)
(52) U.S. Cl.
CPC ............ *H04L 63/20* (2013.01); *H04L 63/083* (2013.01); *H04L 63/104* (2013.01)
(58) Field of Classification Search
CPC ...... H04L 63/20; H04L 63/104; H04L 63/083
See application file for complete search history.

(56) References Cited

U.S. PATENT DOCUMENTS

| | | | |
|---|---|---|---|
| 11,954,238 B1* | 4/2024 | Tan | H04L 9/0891 |
| 2022/0272117 A1* | 8/2022 | Maheve | H04L 63/1416 |
| 2023/0123781 A1* | 4/2023 | Kaimal | H04L 12/66 726/12 |
| 2023/0171243 A1* | 6/2023 | Peddada | H04L 61/4505 726/7 |
| 2023/0171244 A1* | 6/2023 | Peddada | G06F 16/2272 726/7 |

OTHER PUBLICATIONS

Amazon Web Services, Inc., "IP Address condition operators," Date Unknown, 15 pages, [Online] [Retrieved on Feb. 16, 2023] Retrieved from the Internet <URL: https://docs.aws.amazon.com/IAM/latest/UserGuide/reference_policies_elements_condition_operators.html#Conditions_IPAddress>.

* cited by examiner

*Primary Examiner* — Frantz B Jean
(74) *Attorney, Agent, or Firm* — Kwan & Olynick LLP

(57) ABSTRACT

A cloud infrastructure performs governance and security control for datacenters on a cloud platform. The system specifies one or more session policies for the plurality of datacenters. A session policy associated with a datacenter specifies a set of access conditions for accessing the entities of the datacenter, and may be generated based at least on the network information in the declarative specification for the datacenter, and network artifacts from provisioning the network resources for the datacenter. Responsive to receiving a request to access an entity of a datacenter from a user, the system obtains credentials for the user and attaches the session policies. Responsive to determining that the credentials are used to access the datacenter from a set of access conditions that match the set of access conditions in the attached session policy, the cloud platform grants access.

20 Claims, 9 Drawing Sheets

GOVERNANCE AND SECURITY CONTROL FOR SERVICES EXECUTING ON CLOUD PLATFORMS

BACKGROUND

Field of Art

This disclosure relates to cloud computing platforms, and in particular to governance and security control for services executing on cloud computing platforms.

Description of the Related Art

Organizations are increasingly relying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Conventionally, organizations maintained datacenters that housed the hardware and software used by the organization. However, maintaining datacenters can result in significant overhead in terms of maintenance, personnel, and so on. As a result, organizations are shifting their datacenters to cloud platforms that provide scalability and elasticity of computing resources. Organizations maintain cloud infrastructure on cloud platforms using continuous delivery platforms that can manage and deploy applications on cloud platforms.

A large system such as a multi-tenant systems may manage services for many organizations representing tenants of the multi-tenant system and may interact with multiple cloud platforms. A multi-tenant system may have to maintain several thousand such datacenters on a cloud platform, and each datacenter may execute different services. Typically, developers or other users related to services request access to datacenters on cloud platforms to configure or update the services, perform data management on the datacenter, and the like. Thus, the multi-tenant system also performs governance and security control on access requests to the datacenters such that no significant damage to the system is caused by malicious actors. However, it is difficult to manage security restrictions when the number of datacenters is large and when the services and datacenters housing these services come and go dynamically.

Figure 1:
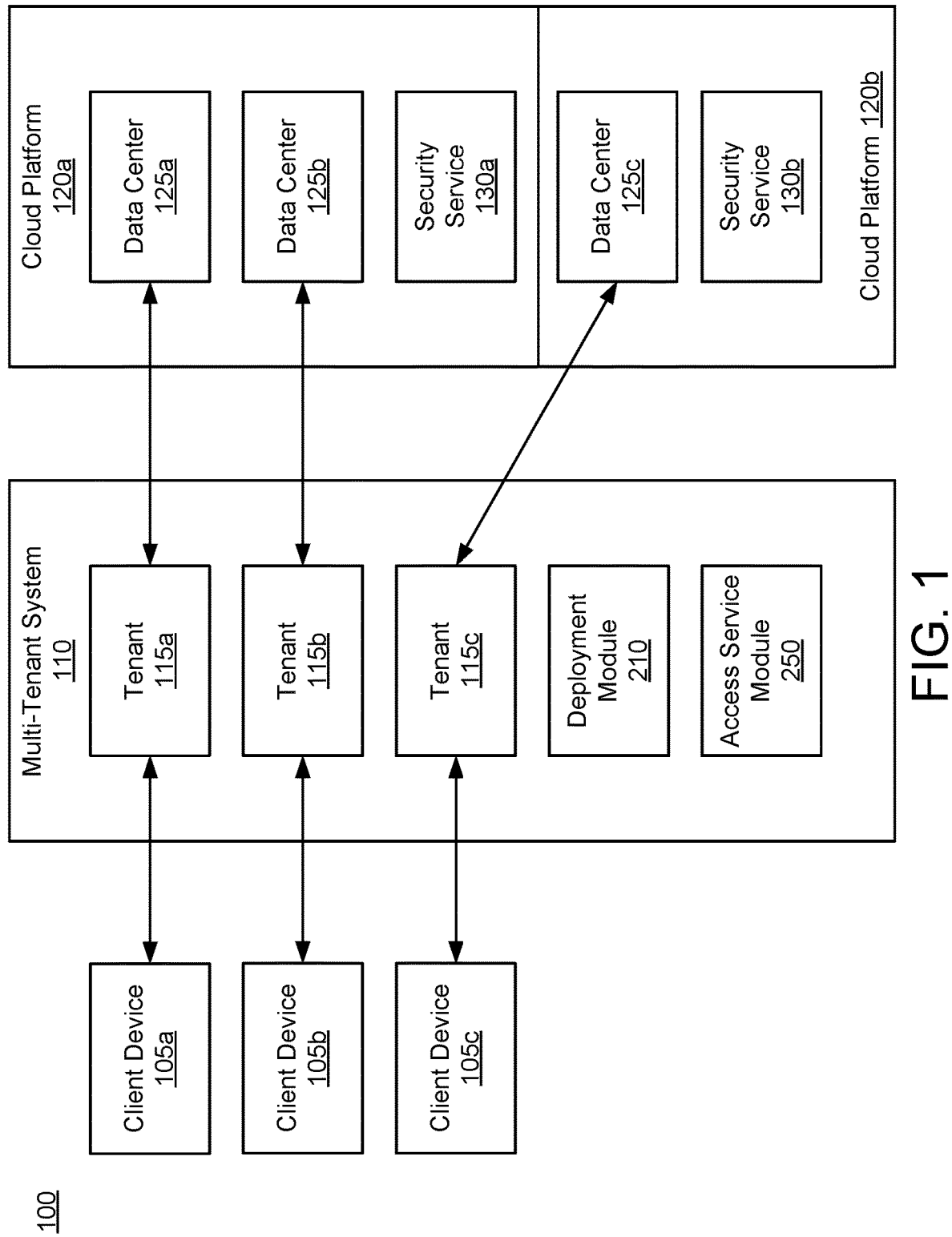
FIG. 1 is a block diagram of a system environment 100 illustrating a multi-tenant system for configuring datacenters on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to reduce upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a datacenter using a cloud platform for use by users of the enterprise. However, implementing a datacenter on each cloud platform requires expertise in the technology of the cloud platform.

Embodiments create datacenters in a cloud platform using a cloud platform infrastructure language that is cloud platform independent. The system receives a declarative specification of a datacenter. The declarative specification describes the structure of the datacenter. The declarative specification is configured to generate the datacenter on any of a plurality of cloud platforms and is specified using a cloud platform infrastructure language. Each cloud platform independent declarative specification may include a hierarchy of datacenter entities, where each datacenter entity includes one or more of (1) a service or (2) one or more other datacenter entities.

The system receives information identifying a target cloud platform for creating the datacenter and compiles the declarative specification to generate a cloud platform specific datacenter representation. The system then sends the cloud platform specific datacenter representation and a set of instructions for execution on the target cloud platform. The target cloud platform executes instructions to configure the datacenter using the platform specific datacenter representation. The system provides users with access to the computing resources of the datacenter configured by the cloud platform.

Embodiments also perform governance and security control for datacenters on the cloud platform. Specifically, the declarative specification for a datacenter may further include network information indicating a network boundary of one or more datacenter entities and from which users can access the entities from. The system specifies session policies for the datacenters. A session policy associated with a datacenter specifies a set of access conditions for accessing the entities of the datacenter, and may be generated based at least on the network information in the declarative specification for the datacenter, and network artifacts from provisioning the network resources for the datacenter. In one embodiment, the network artifacts include anything produced by provisioning the networks for a datacenter, and may include configurations (code), trouble tickets ("bug" reports), communications, design documents, and configuration change histories, and the like. Responsive to receiving a request to access an entity of a datacenter from a user, the system obtains credentials for the user and attaches the session policies associated with the datacenter entity to the credentials. Responsive to determining that the credentials are used to access the datacenter from a set of access conditions that match the set of access conditions in the attached session policy, the cloud platform grants access to the user.

A multi-tenant system may maintain several thousand such datacenters on the cloud platform, and each datacenter may execute different services. Typically, developers or other types of users request access to datacenters to configure or update the services, perform data management on the datacenter, and so on. Thus, it is difficult to manage security restrictions when the number of datacenters is large and when services and datacenters housing these services come and go dynamically. The system disclosed herein provides a centralized way to perform security control in a seamless and secure way with configurable and learned governance. By enforcing a set of rules, the system can prevent damage to the system due to malicious activity or from credentials being compromised.

System Environment

FIG. 1 is a block diagram of a system environment 100 illustrating a multi-tenant system 110 for configuring datacenters on cloud platforms 120 according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant 115 may be associated with an enterprise or other type of organization and may represent a customer of the multi-tenant system 110. For example, a tenant 115 may be an organization for which the multi-tenant system 100 stores customer relationship information and provides analytics on sales and marketing activity of the organization. Each tenant 115 may have multiple users that interact with the multi-tenant system 110 via client devices 105. The multi-tenant system 110 also includes various components for managing the infrastructure and provisioning resources on the cloud platform 120.

Within the multi-tenant system 110, data for multiple tenants 115 may be stored in a same physical database. However, the database is configured so that data of one tenant 115 is kept logically separate from that of other tenants 115 so that one tenant (e.g., tenant 115a) does not have access to another tenant's (e.g., tenant 115b) data, unless such data is expressly shared. It is known to tenants 115 that their data may be stored in a table that is shared with data of other customers. Accordingly, in a multi-tenant system 110, various elements of hardware and software may be shared by one or more tenants 115. For example, the multi-tenant system 110 may execute an application server that simultaneously processes requests for a number of tenants 115. However, the multi-tenant system 110 enforces tenant-level data isolation to ensure that jobs of one tenant 115 do not access data of other tenants 115.

The multi-tenant system 110 also includes a deployment module 210. The deployment module 210 receives one or more declarative specifications from users for one or more datacenters 125 that each specify various entities of a respective datacenter 125. In one embodiment, the declarative specification of a datacenter 125 includes a hierarchical organization of datacenter entities, where each datacenter entity may include one or more services, one or more other datacenter entities, or a combination of both. The deployment module 210 receives the declarative specification and instantiates a datacenter 125 on the target cloud platform 120 according to the declarative specification.

Specifically, a tenant 115 or an entity of the multi-tenant system 110 may provide the deployment module 210 with a declarative specification for a datacenter 125 to be created on a target cloud platform 120 and to perform operations using the datacenter 125, for example, provision resources, perform software releases, and so on. Each tenant 115 may offer different functionality to users of the tenant 115, and thus, each tenant 115 may execute different types of services on the datacenter 125 configured for the tenant 115. A tenant 115 may further obtain or develop versions of software that include instructions for various services executing in the datacenter 125.

In one embodiment, a tenant 115 or an entity of the multi-tenant system 110 may specify in the declarative specification, network information that specifies certain network boundaries of the entities of a datacenter 125 and from which users can access the entities of a datacenter 125. The network boundaries of a datacenter in the declarative specification in one embodiment can refer to the network address or subnet that is assigned to the service (or a set of services in a service group) as it is deployed. In one embodiment, an environment type for a datacenter may also specify that services or service groups within a datacenter may be accessible from corporate VPN or only from bastion servers within the datacenter. The declarative specifications for different datacenters 125 of the cloud platform 120 may specify different degrees of network restrictions depending on, for example, the type of environment the datacenter 125 is a part of. For example, a datacenter 125 that is for a development or test environment may have laxed network access restrictions than a datacenter 125 that is for a production environment and stores customer data. For example, the declarative specification for a datacenter 125 of a production environment may specify access only through a particular bastion host, while the declarative specification for a datacenter 125 of a development environment may specify additional routes of access. The deployment module 210 may further provision the network for the datacenters 125 according to network information described in the declarative specifications.

The multi-tenant system 110 further includes an access service module 250. In one embodiment, the access service module 250 specifies one or more access policies that define permissions for accessing the resources of the datacenters 125. In one instance described herein, an access policy includes one or more session policies that specify one or more restrictions on network access conditions for accessing one or more entities of the datacenter 125. A session policy may be generated based on network information described in the declarative specifications for the datacenters 125 and network artifacts generated by the network provisioner for the datacenters 125. In one instance, the set of network access conditions in the session policy is specified with respect to a combination of Virtual Private Cloud (VPC) identifiers, subnet ranges, and/or source IP address ranges.

In another instance, the access service module 250 also specifies in the access policy a role policy that defines a set of permissions with respect to one or more roles that a user of can assume for the account. For example, the role policy may specify a list of actions that a user of a particular role can or cannot perform on the cloud platform 120. The access policies may be stored in conjunction with the security service 130 of the cloud platform 120.

The access service module 250 receives requests from users to access resources of the cloud platform 120. For example, a user may be a developer of the multi-tenant system 110 responsible for updating security settings for services deployed on the datacenter 125c that is of a production environment. The request may specify an account and an access type. An account of the cloud platform 120 may correspond to one or more entities of a datacenter 125, for example, an account may correspond to a particular service or service group of a datacenter 125. The access type may correspond to a particular role for the account and may be associated with a list of actions permitted for the role in a role policy. For example, an access type may specify read access, write access, or admin-level access for one or more resources (e.g., databases) of the account. In one embodiment, depending on the access type, the access request may need approval from one or more authorized users. For example, an access request specifying a write request to a database may require that one or more authorized users approve the access request in order for the requesting user to write in the database.

In one embodiment, responsive to approving the request, the access service module 250 obtains credentials for the user and also attaches one or more access policies to the credentials. As described above, the access policy may include a role policy describing which specific actions the user of the credentials is given permission to perform and one or more session policies specifying a set of access restrictions. Since the example user is accessing an account located in a datacenter 125 instance of a production environment, the set of network access conditions in the session policy may specify a relatively restricted number of ways of accessing resources of the account and heightened security requirements compared to when a user requests access to a datacenter 125 of a development environment.

In one embodiment, a set of user credentials for a session is also includes a session identifier that uniquely identifies the session the credentials are for. For example, an example session identifier may be "pcsk_readonly_johnsmith_sessionID:9492af3849" for which the user named "johnsmith" assumes a read-only role and a session identifier of 9492af3849 is assigned to the session. In one instance, responsive to receiving an indication to revoke a session for a particular user, access service module 250 may specify in the access policy for the account the session identifier for the session such that the user's credentials for that session are revoked within a short amount of time. As described in more detail below, the access service module 250 adds the session identifier to the access policy for the role in order for the credentials for a particular session to be revoked.

Specifically, there can be instances where a set of credentials for a session need to be revoked. For example, the credentials may be compromised, or malicious activity may be detected on the cloud platform 120 after the credentials have been generated for the user. In such an instance, the access service module 250 is also configured to communicate with the cloud platform 120 such that the cloud platform 120 denies access to users that are attempting to access resources of the cloud platform 120 using those particular credentials.

The cloud platform 120 may also be referred to as a cloud computing platform or a public cloud environment. Examples of cloud platforms 120 include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform 120 include servers, storage, databases, networking, security, load balancing, software, analytics, intelligence, and other infrastructure service functionalities. These infrastructure services may be used by a tenant 115 to build, deploy, and manage applications in a scalable and secure manner.

A datacenter 125 in a cloud platform 120 represents a set of computing resources including servers, applications, storage, memory, and so on that can be used by users, for example, users associated with the tenant 115. The computing resources of a datacenter 125 are secure and may not be accessed by users that are not authorized to access them. For example, a datacenter 125a that is created for users of tenant 115a may not be accessed by users of tenant 115b unless access is explicitly granted for the user. Similarly, datacenter 125b that is created for users of tenant 115b may not be accessed by users of tenant 115a, unless access is explicitly granted.

A cloud platform 120 also includes the security service 130. Responsive to receiving a request from the access service module 250 for a user to access resources, the security service 130 generates a set of credentials for the user of an account and also attach one or more access policies for the user. The security service 130 may provide the credentials and the access policies to the access service module 250. The security service 130 may subsequently receive a request to access resources from the user with the set of credentials. The security service 130 authenticates the request using the credentials and determines whether the user is in compliance with the access policies attached to the user credentials. In one instance, the security service 130 determines whether the user is using the credentials within the network boundary specified in the session policies. If the permissions match, the security service 130 grants the request such that the user can access the resources of the account. Otherwise, the security service 130 may deny the request.

Since the multi-tenant system 110 manages a large number of datacenters 125 for a large number of tenants 115, the access service module 250 of the multi-tenant system 110 provides a centralized manner of governance and security control based on network access conditions specified in the session policies. Specifically, the network boundaries of datacenters and their entities within cloud platforms dynamically change over time, for example, as new datacenters are instantiated and existing datacenters are deleted. Thus, it is difficult for the access service module 250 to track numerous changes and enforce the required conditions. The access service module 250 can automatically retrieve updated network information in the declarative specifications and network provisioning artifacts as they change over time, and update the session policies to reflect these network boundary changes. This ensures that users are accessing resources on the cloud platform 120 according to these updated security boundaries. In this manner, the access service module 250 can effectively provide seamless security enforcement across many instances of datacenters and datacenter entities for multiple tenants 115.

Each component shown in the system environment 100 of FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions. The interactions between the various components of the system environment 100 are typically performed via a network, not shown in the system environment 100 of FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system with multiple tenants, the techniques can be implemented using other systems that may not necessarily be multi-tenant systems. For example, an online system used by a single organization or enterprise may use the techniques disclosed herein to create one or more datacenters on one or more cloud platforms.

System Architecture of Deployment Module

Figure 2:
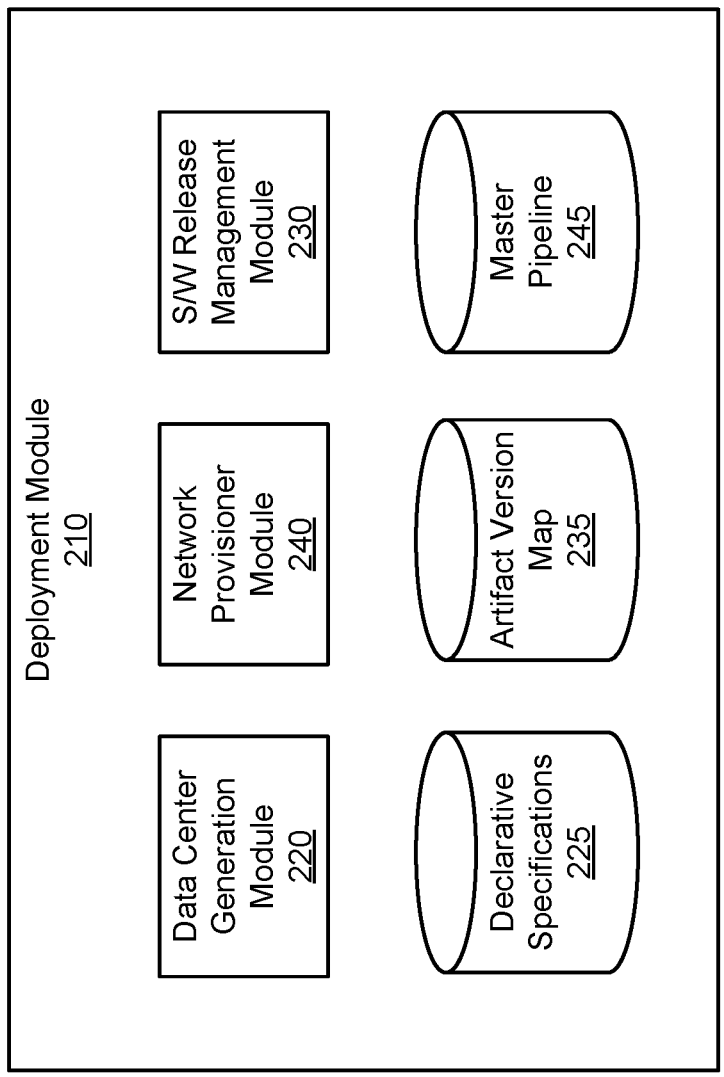
FIG. 2 is a block diagram illustrating a system architecture of a deployment module of the multi-tenant system, according to an embodiment.

FIG. 2 is a block diagram illustrating a system architecture of a deployment module 210 of the multi-tenant system 110, according to an embodiment. In one embodiment, the deployment module 210 includes a datacenter generation module 220, a network provisioner module 240, and a software release management module 230. The deployment module 210 also includes a declarative specifications store 225, an artifact version map store 235, and a master pipeline store 245. Other embodiments can have different and/or other components than the ones described here, and that the functionalities can be distributed among the components in a different manner.

The datacenter generation module 220 includes instructions for creating datacenters 125 on the cloud platform 120. The datacenter generation module 220 receives from users a cloud platform independent declarative specification of a datacenter 125. The cloud platform independent declarative specifications of different datacenters 125 may be stored in the declarative specifications store 225. Specifically, a declarative specification of a datacenter 125 specifies various entities of the datacenter 125. In an embodiment, declarative specification of a datacenter 125 includes a hierarchical organization of datacenter entities, where each datacenter entity may include one or more services, one or more other datacenter entities, or a combination of both. The datacenter generation module 220 receives the declarative specification for a datacenter and a target cloud platform as input and generates a cloud platform specific metadata representation for the target cloud platform. The datacenter generation module 220 deploys the generated cloud platform specific metadata representation on the target cloud platform to create a datacenter 125 on the target cloud platform according to the declarative specification.

Figure 3:
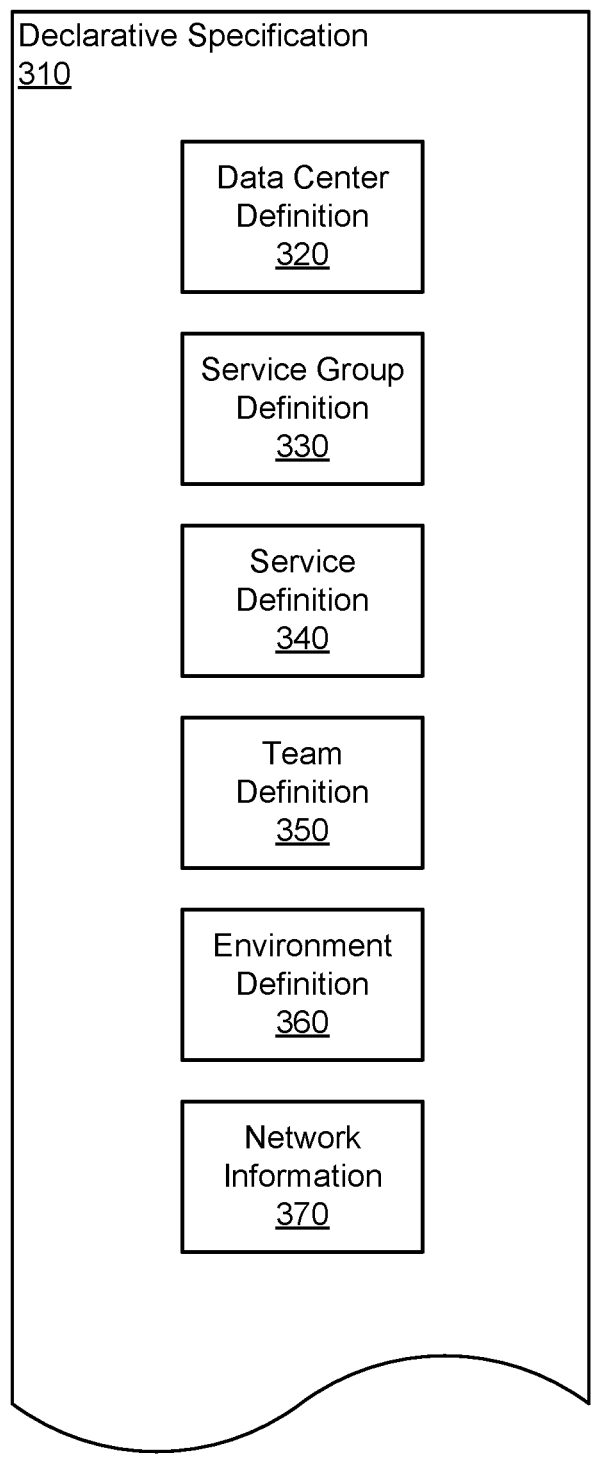
FIG. 3 illustrates an example of a declarative specification of a datacenter according to one embodiment.

FIG. 3 illustrates an example of a declarative specification 310 of a datacenter 125 according to one embodiment. The declarative specification 310 includes multiple datacenter entities. A datacenter entity is an instance of a datacenter entity type and there can be multiple instances of each datacenter entity type. Examples of datacenter entities include datacenters, service groups, services, teams, environments, and schemas.

The declarative specification 310 includes definitions of various types of datacenter entities including a datacenter, a service group, a service, a team, an environment, and network information. The following is a description of various types of datacenter entities and their examples. The examples are illustrative and show some attributes of the datacenter entities, but embodiments are not limited hereto. Other embodiments may include different attributes and an attribute with the same functionality may be given a different name than that described herein. In an embodiment, the declarative specification 310 is specified using hierarchical objects, for example, JSON (Javascript object notation) that conform to a predefined schema.

A datacenter definition 320 specifies the attributes and components of a datacenter instance. A declarative specification 310 may specify multiple datacenter instances. The datacenter definition 320 specifies attributes including a name, description, a type of environment, a set of service groups, teams, domain name servers for the datacenter 125, and so on. A datacenter definition 320 may specify a schema definition and any metadata representation generated from the datacenter definition 320 is validated against the specified schema definition. A datacenter 125 includes a set of core services and capabilities that enable other services to function within the datacenter 125. An instance of a datacenter is deployed in a particular cloud platform 120 and may be associated with a particular environment type. As an example, the environment type may be one of a development, testing, staging, or production environment.

Following is an example definition 320 of a datacenter instance. The datacenter definition 320 includes a list of service groups included in the datacenter instance and other attributes including an environment of the datacenter, a datacenter identifier, a name, a region representing a geographical region, one or more teams associated with the datacenter, and a schema version.

```
{
    "datacenter_instance": {
        "environment": "env1",
        "datacenter_instance_identifier": "id1",
        "name": "data_center1",
        "region": "region1",
        "service_groups": [
            "service_group1",
            "service_group2",
            "service_group3",
            "service_group4",
            ...
        ],
        "schema_version": "1.0",
        "admin_team":"admins",
```

A service group definition 330 represents a set of capabilities and features and services offered by one or more computing systems that can be built and delivered independently, in accordance with one embodiment. A service group may be also referred to as a logical service group, a functional unit, or a bounded context. A service group may also be viewed as a set of services of a set of cohesive technical use-case functionalities offered by one or more computing systems. A service group enforces security boundaries. A service group defines a scope for modifications. Thus, any modifications to an entity, such as a capability, feature, or service offered by one or more computing systems within a service group may propagate as needed or suitable to entities within the service group but does not propagate to an entity residing outside the bounded definition of the service group.

A datacenter may include multiple service groups. A service group definition 330 specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants 115 or users interested in developing a datacenter 125 have a library of service groups that they can readily use. The boundaries around services of a service groups are based on security concerns and network concerns among others. A service group is associated with protocols for performing interactions with the service group. In an embodiment, a service group provides a collection of API's (application programming interfaces) and services that implement those API's. Furthermore, service groups are substrate independent. A service group may provide a blast radius scope for the services within the service group so that any failure of a service within the service group has impact limited to services within the service group and has minimal impact outside the service group.

Following is an example of a specification of a service group definition 330. The service group definition 330 specifies various attributes representing metadata of the service group and includes a set of services within the service group. There may be other types of metadata specified for a service group, not indicated herein.

```
{
    "service_group": [
        {
            "cells": [ ],
            "description": "Service group Service Instance Definitions",
            "service_group_id": "id1",
            "name": "name1",
            "schema_version": "1.0",
            "cluster_instances": [
                {
                    "cluster_instance_name": "cluster1",
                    "cluster_type": "cluster_type1"
                },
                {
                    "cluster_instance_name": " cluster2",
                    "cluster_type": " cluster_type1"
                },
                {
                    "cluster_instance_name": " cluster3",
                    "cluster_type": " cluster_type2"
                }
            ],
            "service_instances": [
                {
                    "service_instance_name": "serviceinstance0001",
                    "service_type": "servicetype1"
                },
                {
                    "service_instance_name": "serviceinstance0002",
                    "service_type": " servicetype1"
                    "cluster_instance": "cluster1"
                },
                {
                    "service_instance_name": "serviceinstance0003",
                    "service_type": " servicetype2"
```

-continued

```
                },
                ...
            ],
            "service_teams": ["team1"],
            "type": "servicetype"
            "security_groups":[
                {
                    "name":"group1",
                    "policies":[
                        {
                            "description":"Allow access from site S1",
                            "destination":{ "groups":[ "group2" ] },
                            "environments":["dev", "test", "staging" ],
                            "source":{
                                "iplist":"URL1",
                                "filters":[ filter-expression" ]
```

As shown in the example above, a service group definition 330 may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group definition 320 also specifies a set of services. A service group definition 330 may specify a cluster for a service so that the datacenter 125 deployed on a cloud platform 120 runs clusters of computing nodes and maps the services to clusters based on the specified mapping if included in the declarative specification 310. For example, in the service group definition 330 example shown above, the service instance serviceinstance0002 is specified to run on cluster instance cluster1.

The service group definition 320 may also specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white-listed for a set of service groups identified by the filtered set and accordingly these computing systems are allowed access to the service group or to specific set of services within the service group. In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to.

A service definition 340 specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition 340 may specify listening ports attribute specifying the ports that the service can listen on for different communication protocols, for example, the service may listen on a port p1 for UDP protocol and a port p2 for TCP protocol. Other services within the datacenter 125 can interact with a service via the ports specified by the service.

The service definition 340 specifies an attribute outbound access that specifies destination endpoints, for example, external URL's (uniform resource locators) specifying that the service needs access to the specified external URL's. The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized_clients": [ ],
      "build_dependencies": [ ],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ...],
      "sub_services": [ "service1", " service2", " service3", ... ],
      "listening_ports":[
        { "protocol":"tcp", "ports":[ "53"  ]  },
        { "protocol":"udp", "ports":[ "53" ]  }
      "outbound_access":[
        {
          "destination":[
            {
              "endpoints":[  ".xyz.com:443", ".pqr.com:443" ]
            }
```

A team definition 350 includes team member names and other attributes of a team. For example, the attributes may include name, email, communication channel and so on. A service may be associated with one or more teams that are responsible to modifications made to that service. Accordingly, any modification made to that service is approved by the team. A service may be associated with a team responsible for maintenance of the service after it is deployed in a cloud platform 120. A team may be associated with a service group and is correspondingly associated with all services of that service group. For example, the team may approve any changes to the service group, for example, services that are part of the service group. A team may be associated with a datacenter 125 and is accordingly associated with all service groups within the datacenter 125. A team association specified at a datacenter level provides a default team for all service groups within the datacenter and may further provide a default team for all services within the service groups.

In one embodiment, a team association specified at the functional level overrides the team association provided at the datacenter level. Similarly, a team association specified at the service level overrides the default that may have been provided by a team association specified at the service group level or a datacenter level. A team can decide how certain actions are taken for the datacenter entity associated with the team. The team associations can also determine the number of accounts on the cloud platform that are created for generating the final metadata representation of the datacenter 125 for a cloud platform 120 by the compiler and for provisioning and deploying the datacenter 125 on a cloud platform 120. The datacenter generation module 220 creates one or more user accounts in the cloud platform 120 and provides access to the team members to the user accounts. Accordingly, the team members are allowed to perform specific actions associated with the datacenter entity associated with the team, for example, making or approving structural changes to the datacenter entity or maintenance of the datacenter entity when it is deployed including debugging and testing issues that may be identified for the datacenter entity.

An environment definition 360 specifies a type of system environment represented by the datacenter 125, for example, development environment, staging environment, test environment, or production environment.

The network information 370 defines network boundaries of a datacenter and entities of the datacenter and specifies a set of access entities from which resources of the datacenter 125 can be accessed from. In one embodiment, the declarative specification 310 specifies one or more VPC networks within the datacenter 125 that are each an on-demand pool of shared resources allocated within one or more datacenter entities and provide a level of isolation between the users using the resources. For example, a service group may include multiple VPC networks. Each VPC network may be identified via a VPC identifier (ID). A VPC network may include one or more subnets, and each subnet is a range of IP addresses within a VPC. Similarly, each subnet may be identified via a subnet ID. For example, a VPC network may include a public subnet and a private subnet, where instances in the public subnet can connect to the internet but instances in the private subnet cannot. In one instance, a public subnet may include a Network Address Translation (NAT) gateway that forwards traffic from instances in the private subnet to the internet or other entities of the cloud platform 120 and sends back a response to the instance.

In one embodiment, the network information 370 specifies a set of access entities and network properties of the access entities from which resources of the datacenter 125 can be accessed. One example of such an access entity is a bastion host that provides access to a private subnet from an external network and withstands attacks to reduce chances of compromise. One method a user may connect to the bastion host is via SSH. The network properties of the access entities may further specify which network the access entity is located within. For example, the network information 370 may specify the VPC ID of the bastion host and requests coming through the bastion host will be associated with this VPC ID. Another access entity is a public proxy. Similarly, the network information 370 may specify the VPC ID of the public proxy.

Following is an example of a network definition for a datacenter.

```
{
    "FIID_SourceType": "f6ae6700-bd2b-454d-9513-
5b95fe6cb671_Firebom",
        "Version": 1,
        "FIId": "f6ae6700-bd2b-454d-9513-5b95fe6cb671",
        "SourceType": "Firebom",
        "NetworkInformation": {
            "BASTION_VPCS": [ "vpc-xxx" ],
            "PUBLIC_PROXY_VPCS": [ "vpc-yyy" ],
            "PRA_VPCS": [ "vpc-zzz" ]
        },
        "FIName": "perf1-useast2"
}
```

As shown in the example above, a network information 370 may specify a set of access entities including a bastion, a public proxy, and remote access, and specify any network properties (e.g., VPC ID's) of each access entity.

Returning to FIG. 2, the network provisioner module 240 sets up the network for instances of the datacenters 125 of the cloud platform 120 based on the information in the declarative specifications 310. The network provisioner module 240 may provision the networks using cloud platform specific features and network functionality such that the security policies and communication protocols for datacenter entities in the declarative specification 310 are implemented and established. The network provision module 240 may set up VPC networks and specify IP addresses and subnets (ranges of IP addresses) for instances within the VPC. Thus, during this process, one or more access entities of a datacenter entity may be associated with subnets or IP address ranges. For example, the network provisioner module 240 may specify a public subnet within a VPC network. A bastion host residing within the public subnet will have addresses associated with the subnet, and a request coming through the bastion host will be associated with the subnet ranges as well as any VPC ID associated with the bastion host. As yet another example, the network provisioner 240 may configure NAT gateways within subnets and specify IP addresses for the NAT gateways. In one embodiment, the network provisioner module 240 generates network artifacts with this information after provisioning the networks for a datacenter.

Following is an example of a network artifact generated by the network provisioner module 240.

```
{
    "FIID_SourceType": "5bdd54ea-550e-4edd-b46e-
98d71286d6d2_NetworkProv",
        "Version": 1,
        "FIId": "5bdd54ea-550e-4edd-b46e-98d71286d6d2",
        "SourceType": "NetworkProvisioner",
        "NetworkInformation": {
            "public_proxy_natgw_subnets": [
                "10.10.10.0/24",
                "20.20.20.0/24"
            ]
        },
        "FIName": "aws-dev2-uswest2"
}
```

As shown in the example above, the network artifact specifies the public proxy NAT gateway subnets or source IP address ranges, after the subnets have been configured.

The software release management module 230 manages software releases for various services or applications running on the datacenters 125 created by the datacenter generation module 220. The software release management module 230 receives as inputs an artifact version map 235 and a master pipeline 245. The artifact version map 235 identifies specific versions of software releases or deployment artifacts targeted for deployment on specific datacenter entities. The artifact version map 235 maps datacenter entities to software release versions that are targeted to be deployed on the datacenter entities. The master pipeline 245 includes instructions for operations related to software releases on the datacenter 125, for example, deployment of services, destroying services, provisioning resources for services, destroying resources for services, and so on.

The master pipeline 245 may include instructions for performing operations related to software releases for environments such as development environment, test environment, canary environment, and production environment, and instructions for determining when a software release is promoted from one environment to another environment. For example, if the deployments of a software release in a development environment execute more than a threshold number of successful test cases, the software release is promoted to a test environment for further testing, for example, system level and integration testing. If the software release in a test environment passes a threshold of test coverage, the software release is promoted to a canary environment where the software release is provided to a small subset of users on a trial basis. If the software release in a canary environment executes without errors for a threshold time duration, the software release is promoted to production environment where the software release is provided to all users.

The software release management module 230 compiles the input artifact version map 235 and the master pipeline 245 to generate a cloud platform specific detailed pipeline that is transmitted to the target cloud platform. The cloud platform specific detailed pipeline includes instructions for deploying the appropriate version of a software release or deployment artifact on the datacenter entities as specified in the artifact version map 235. The software release management module 230 may receive modifications to one of the inputs. For example, a user may modify the input artifact version map 235 and provide the same master pipeline 245. Accordingly, the same master pipeline is being used but different software releases are being deployed on datacenter entities. The software release management module 230 recompiles the inputs to generate a new cloud platform specific detailed pipeline that deploys the versions of software releases according to the new artifact version map 235.

Figure 4:
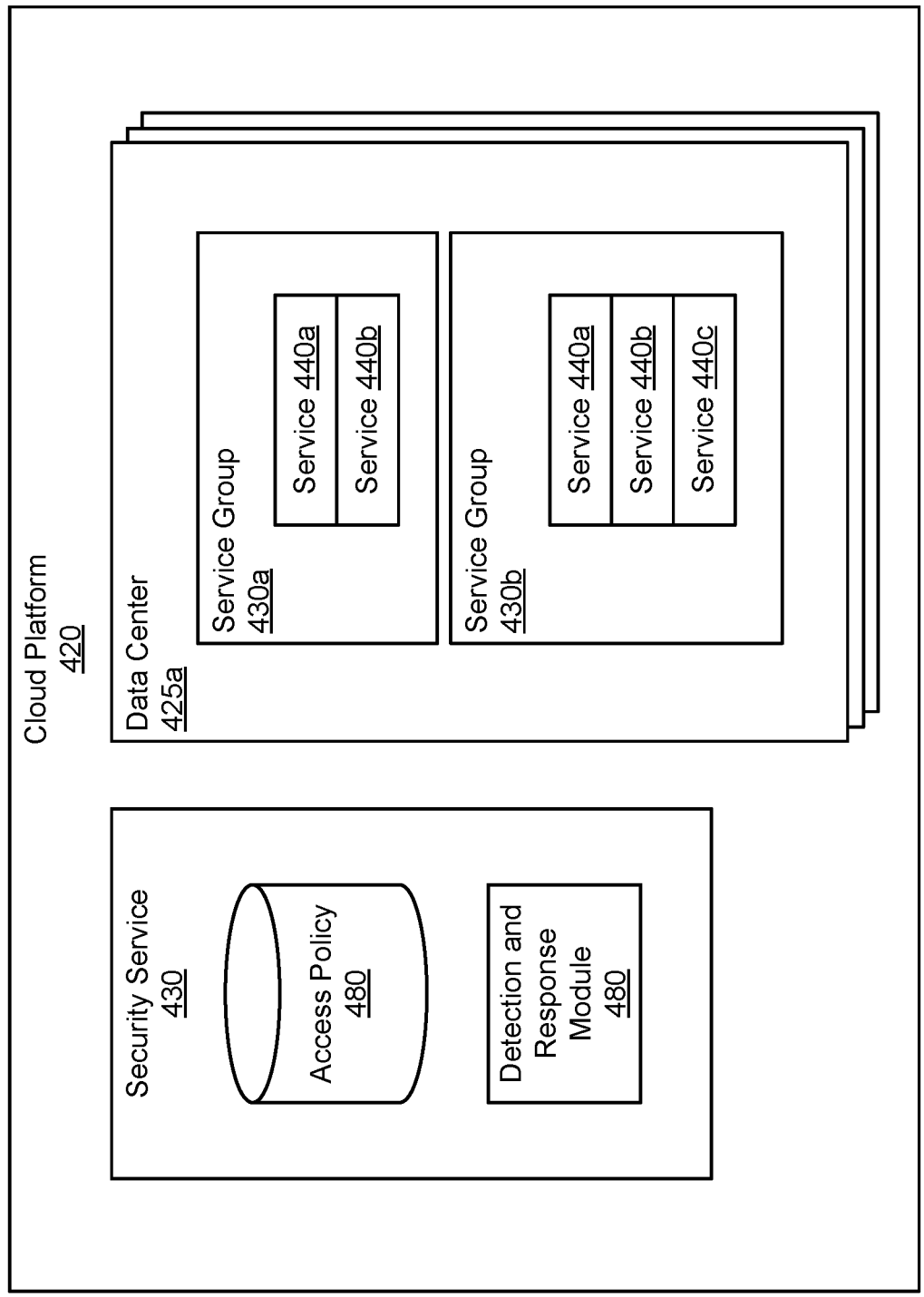
FIG. 4 illustrates example datacenters created on a cloud platform, according to one embodiment.

FIG. 4 illustrates example datacenters 425 created on a cloud platform 420, according to one embodiment. The datacenters 425 may be created based on the declarative specifications processed by the datacenter generation module 220. As shown in FIG. 4, multiple instances of datacenters 425 may be configured within a cloud platform 120. Each datacenter 425 may correspond to a tenant 115 of a multi-tenant system 110, or a tenant 115 may create one or more datacenters 425. Alternatively, a datacenter 425 may be created by any computing system including the multi-tenant system 110. Each datacenter includes one or more service groups, for example, datacenter 425a includes service groups 430a and 430b. A datacenter 425 may include multiple instances of a particular type of service group. Each service group includes a set of services. For example, service group 430a includes services 440a and 440b, service group 430b includes services 440a, 440b, and 440c. A service group may include multiple instances of services of the same service type.

As described in conjunction with FIG. 1, the cloud platform 120 also includes security service 430, the functionality of which is identical or similar to the security service 130 of FIG. 1. The security service 430 includes an access policy store 430 that stores access policies for, for example, different accounts on the cloud platform 120, where an account can correspond to a service or a service group, or any datacenter entity. In one embodiment, the access service module 250 of the multi-tenant system 110 can generate one or more customized access policies.

As described in conjunction with FIG. 1, the access policy 480 for an account includes one or more session policies that specify a set of restrictions on network access conditions for accessing resources of the datacenter 425. In one embodiment, the access service module 250 specifies a session policy based on the network information in the declarative specification and the network artifact generated by the network provisioner module 240. Specifically, the network properties of the access entities in the declarative specification and the address ranges in the network artifact together may define the set of network access conditions. Thus, in one embodiment, the network access conditions for session policies are a combination of VPC ID's, subnet ranges, and/or external/internal IP address ranges that a request comes from to access resources on the cloud platform 420. Specifically, the network access conditions may include, but are not limited to, subnets of VPN's, NAT gateway subnets of public proxy of datacenters or service groups within datacenters, VPC ID's of edge nodes of datacenters or service groups within datacenters. In other words, when attached to user credentials, the security service 430 allows access only when the credentials are used from a VPN, a particular set of subnets, and the like.

In one embodiment, the level of restriction imposed by session policies differ on a per environment basis depending on how restrictive the access conditions are. Specifically, the session policies for an account in a production environment may be more restrictive than session policies for an account in a development environment with respect to, for example, the number of ways a user can access resources in the datacenter 425 of the production environment (e.g., number of ways to access production environment is smaller compared to development environment) or heightened security requirements for connecting to the datacenter 425.

In one embodiment, the session policies are granularized with respect to different datacenter entities within a datacenter 425, and the set of network access conditions may be specified for a particular datacenter entity. For example, service group 430b of one datacenter may have a different set of network access conditions (e.g., via a first bastion host located in subnet 5) for accessing resources than service group 430a (e.g., via a second bastion host located in subnet 8). Thus, the access service module 250 may generate session policies that describe network access conditions tailored to the particular service or service group associated with the account. In other words, the session policy may not allow access to other services or service groups within a same datacenter that the user does not need access to.

```
{
    "Version": "2012-10-17",
    "Statement": [
```

```
        {
            "Sid": "AllowAllActionsIfFromVPCId",
            "Effect": "Allow",
            "Action": "*",
            "Resource": "*",
            "Condition": {
                "StringEquals": {
                    "aws:sourceVpc": [
                        "vpc-123",
                        "vpc-456"
                    ]
```

As shown in the example above, when attached to user credentials, the session policy allows access to resources for the request only if the request is from instances within two VPC networks, VPC-123 and VPC-456.

In another instance, an access policy 480 also includes a role policy that defines a set of permissions with respect to one or more roles that a user can assume for the account. For example, the role policy may specify a list of actions that a user of a particular role can or cannot perform on the cloud platform 420. For example, each member of a team associated with an account may assume a role within a set of roles defined for the account. For example, a read-only role may allow a user to perform a set of read-only actions for objects of the account. As another example, a read-write role may allow a user to perform both read and write actions for objects of the account. As yet another example, an administrator role may allow a user to perform read and write actions, as well as configure various security settings and role settings for other users of the account.

In one embodiment, the role policy allows, for each role, an administrator to configure a deny policy for that role that lists a set of actions that are not permitted for that role. In one instance, the actions listed in the deny policy apply to all users that assume that particular role. Thus, once a set of credentials for a user for a particular role is compromised, the access service module 250 may have to revoke actions to resources for all users who assumed the role, and it may be inconvenient for other users to gain access to resources until the compromise is resolved. Thus, in one embodiment, responsive to the access service module 250 receiving an indication to revoke a particular session for a user, the role policy for the role of the user may be updated to include one or more denial conditions that include the session identifier for a particular session. In this manner, once a session has to be revoked, the access policy for an account may be updated to include the session identifier for a session under the deny policy for the role, and the deny policy may only be relevant to the particular session at issue.

The security service 430 receives a request to generate credentials for a particular user from the multi-tenant system 110. Responsive to receiving the request, the security service 430 generates the credentials for the user and also attaches an access policy to the credentials. In one instance, the access policy for the user may include a role policy that defines the scope of permissions depending on the assumed role for the user. In one instance, the access policy for the user includes a session policy that defines the allowed network boundary from which the user can use the credentials from to access resources of the account.

In one embodiment, based on an updated access policy that includes one or more session identifiers as denial conditions, the security service 430 may determine whether the session identifier attached to a set of credentials matches the session identifiers in a deny policy for that role. Responsive to a determination, the security service 430 may revoke the session such that the user cannot access the resources with the credentials.

In one embodiment, the security service 430 also includes a detection and response module 480. In one instance, the detection and response module 480 performs real-time monitoring on activities occurring for the datacenter entities during an active session. When the detection and response module 480 detects malicious activity during an active session, the detection and response module 480 provides an indication to the access service module 250 to revoke the session. The access policy for the account is updated with the session identifier in the deny policy for the role such that the session can be revoked.

Configuration of Cloud Infrastructure with Governance and Security Control

Figure 5:
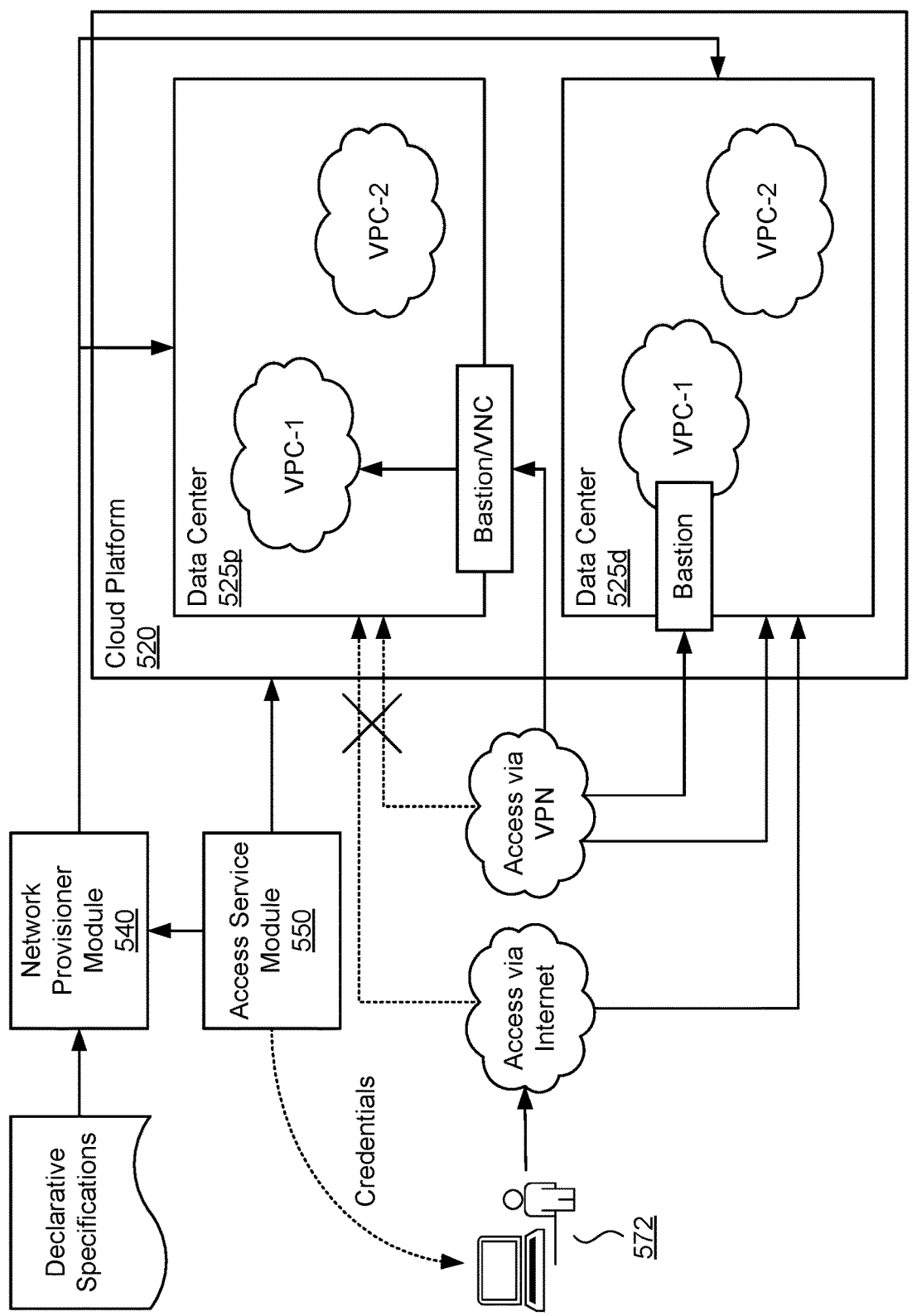
FIG. 5 shows the overall configuration of a cloud infrastructure with governance and security control according to an embodiment.

FIG. 5 shows an overall configuration of a cloud infrastructure with governance and security control according to an embodiment. As illustrated in FIG. 5, the cloud infrastructure presented herein includes a cloud platform 520 in communication with an access service module 550. The access service module 550 may be substantially similar or identical to the functionality of the access service module 250 described in conjunction with FIG. 1. The access service module 550 is in communication with a network provisioner module 540. The network provisioner module 540 may be substantially similar or identical to the functionality of the network provisioner module 240 described in conjunction with FIG. 2.

Datacenters of the example cloud platform 520 may be instantiated based on one or more declarative specifications, as described with respect to FIG. 3. For example, a datacenter 525p may be instantiated from a first declarative specification and a datacenter 525d may be instantiated from a second declarative specification. Specifically, the datacenter 525p is of a production environment, and the datacenter 525d that is a development environment. The network provisioner module 540 obtains network information from the declarative specifications of the datacenters, and provisions the network for entities of the datacenters. Datacenter 525p includes one or more datacenter entities within a VPC network VPC-1 and one or more datacenter entities within a VPC network VPC-2. Datacenter 525d includes one or more datacenter entities within a VPC network VPC-1 and one or more datacenter entities within a VPC network VPC-2.

Moreover, based on information obtained from the declarative specifications and the network artifacts from the network provisioner module 540, users are only allowed to access resources within VPC-1 of datacenter 525p through a specific set of bastion and VNC servers through VPN. Thus, users may only be allowed access to the datacenter 525p if the access is from a particular address range associated with the bastion and VNC servers. In contrast, users are allowed to access resources within VPC-1 of datacenter 525d through multiple routes, including through the Internet, through VPN, and through a specific bastion server. Thus, a user may be allowed access to the datacenter 525d if the access is from address ranges that are associated with these routes.

A user 572 requests access to resources of the cloud platform 520 for an account and may request an access type associated with one or more roles. Responsive to approving the request, the access service module 550 obtains credentials for the user and also attaches one or more access policies to the credentials. As described above, the access policy may include a role policy describing permissions of the role the user 572 assumed and one or more session policies specifying a set of access restrictions for accessing the requested resources of the cloud platform 520. The user 572 accesses the requested resources with the credentials and the attached access policies. For example, when the requested resources are within VPC-1 network of datacenter 525p, a security service (not shown) of the cloud platform 520 may only allow access if the user 572 uses the credentials to access the resource through the specific set of allowed bastion and VNC servers and deny access otherwise.

In one embodiment, the access service module 550 for each access policy for an account, hashes the policy and assigns a version to the hashed policy. The hashed policies may be stored in a separate database. When network information in a declarative specification or network artifact information from the network provisioner module 540 is updated for an account, the access module 550 updates the hash for the access policy and updates the version. When a user requests access to the account, the access service module 550 first determines the version of the access policy stored in the cloud platform 520 (e.g., access policy store 480). If the version of the access policy in the cloud platform 520 matches the version of the access policy (e.g., by matching the hash) stored by the access service module 550, the access service module 550 may proceed to obtain credentials for the user and provide the credentials to the user. If the access policy for the account is an older version than the one stored by the access service module 550, the access service module 550 may update the access policy to the more recent version. The user is provided with credentials and the updated access policy attached to the credentials.

In this manner, the access service module 550 can automatically retrieve updated network information in the declarative specifications and network provisioning artifacts as they change over time and update the session policies to reflect these network boundary changes. This ensures that users are accessing resources on the cloud platform 520 according to these updated security boundaries without the need for the access service module 550 to manually configure the network boundaries when the number of datacenters and accounts within the datacenters can get significantly large.

Configuration of Cloud Infrastructure with Session Revocation

Figure 6:
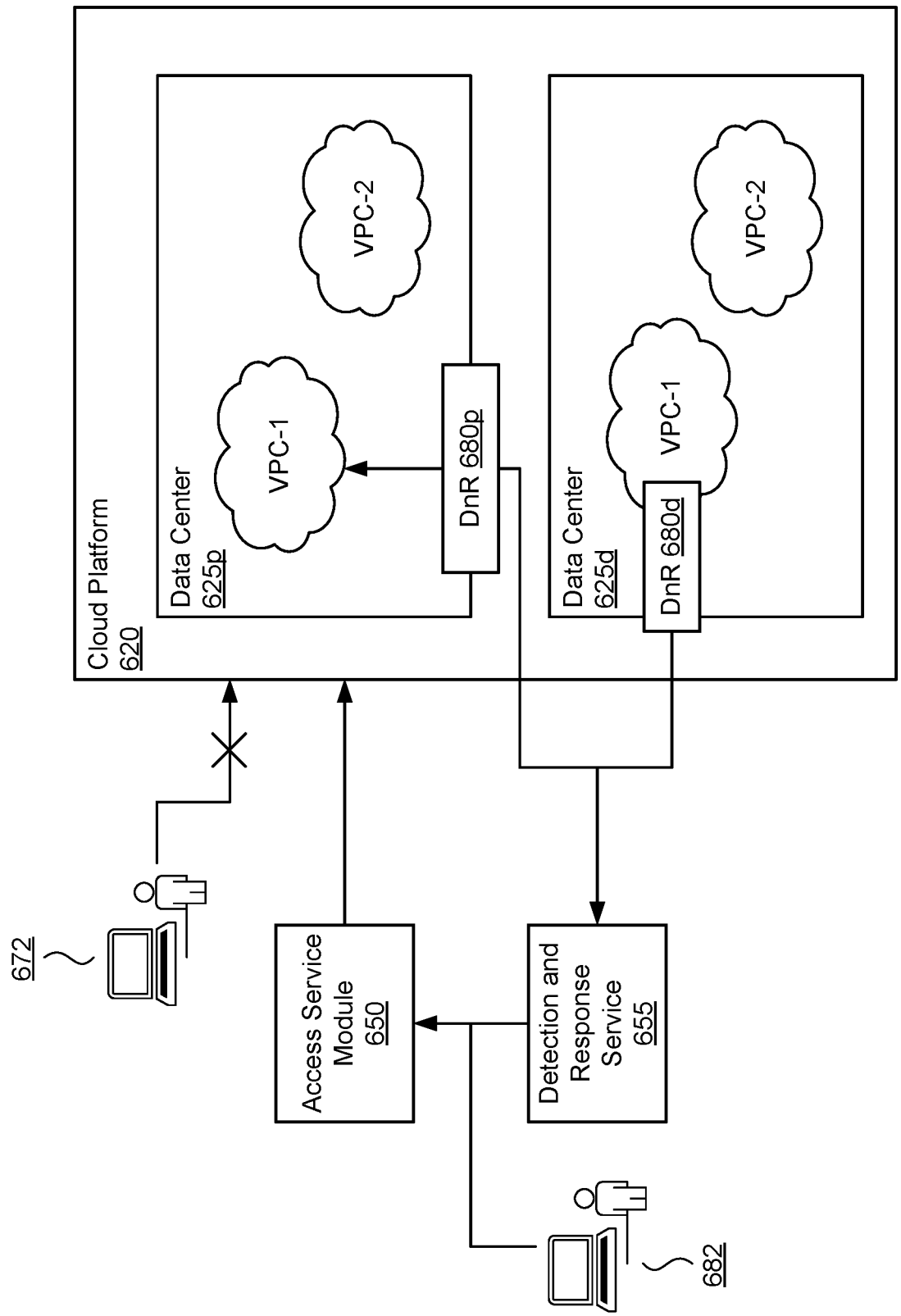
FIG. 6 shows an overall configuration of a cloud infrastructure with session revocation according to an embodiment.

FIG. 6 shows an overall configuration of a cloud infrastructure with session revocation according to an embodiment. As illustrated in FIG. 6, the cloud infrastructure includes cloud platform 620 in communication with an access service module 650. The access service module 650 may be substantially similar or identical to the functionality of the access service module 650 described in conjunction with FIG. 1. In one embodiment, the cloud infrastructure further includes a detection and response service 655. In one embodiment, the detection and response service 655 is included as a component of the multi-tenant system 110. However, it is appreciated that in other embodiments, the detection and response service 655 may be included in other systems of the system environment.

Datacenters of the example cloud platform 620 may be similar to those described with respect to the cloud infrastructure of FIG. 5, and may include datacenter 625p including VPC networks VPC-1 and VPC-2, and datacenter 625d including VPC networks VPC-1 and VPC-2. In the example illustrated in FIG. 6, the datacenter 625p is monitored by detection and response module 680p (similar to functionality of detection and response module 480) and the datacenter 625d is monitored by detection and response module 680d. A user may access resources within the cloud platform 620 using a set of credentials. The set of credentials may be associated with a session identifier. Responsive to detecting malicious activity, either the detection and response module 680p or detection and response module 680d may inform the detection and response service 655. After verifying the malicious activity (e.g., by a security administrator auditor 682), the detection and response service 655 may provide an indication to the access service module 650 to revoke the particular session. Responsive to receiving the indication to revoke, the access service module 650 adds the session identifier to the deny policy for the role such that the session is revoked thereafter.

Figure 7:
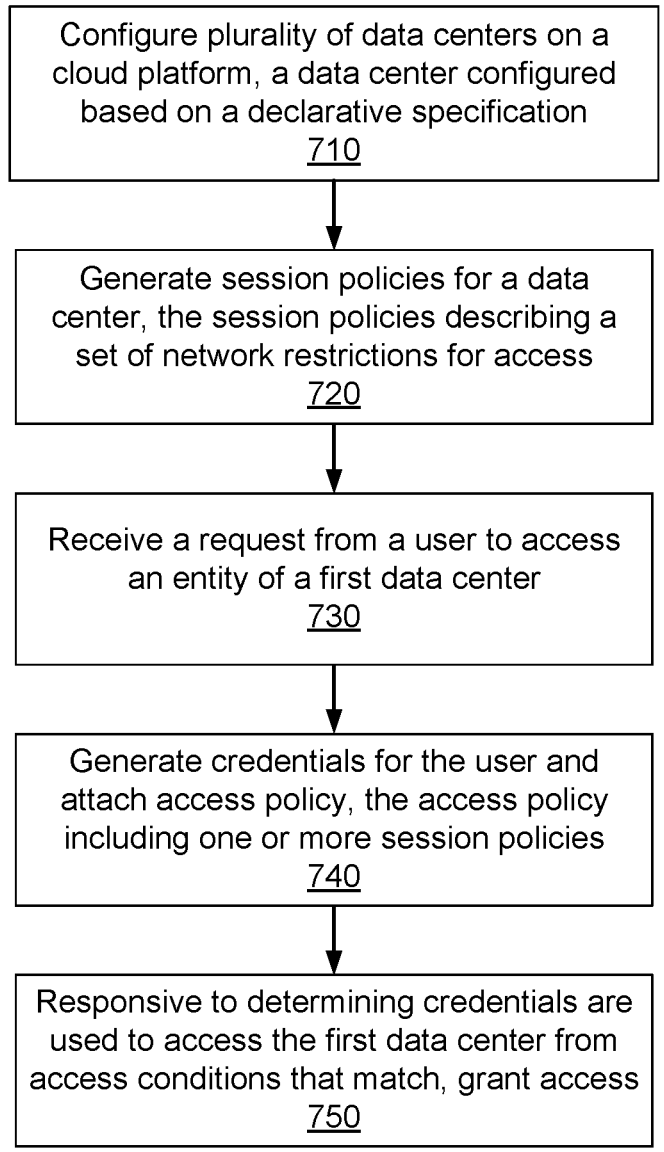
FIG. 7 illustrates a flowchart for a method of imposing network restrictions to datacenters of a cloud infrastructure according to an embodiment.

FIG. 7 illustrates a flowchart for a method of imposing network restrictions to datacenters of a cloud infrastructure according to an embodiment. In one embodiment, the method illustrated in FIG. 7 is performed by various components of the cloud infrastructure described herein.

An online system configures 710 a cloud platform a plurality of datacenters. A datacenter may be configured based on a declarative specification describing network information that indicates a network boundary of one or more datacenter entities of the datacenter. The online system generates 720 session policies for a datacenter. The session policies associated with the datacenter may describe a set of network restrictions for accessing entities of the datacenter, and the set of network restrictions may be determined based at least on the network information of the datacenter. The online system receives 730 a request from a user to access an entity of a first datacenter. The online system generates 740 credentials for the user and attaches an access policy associated with the first datacenter to the credentials. The access policy may include one or more session policies associated with accessing the entity of the first datacenter. Responsive to determining that the credentials are used to access the first datacenter from a set of access conditions that match the set of network restrictions in the attached one or more session policies, the online system grants 750 access to the user.

Figure 8:
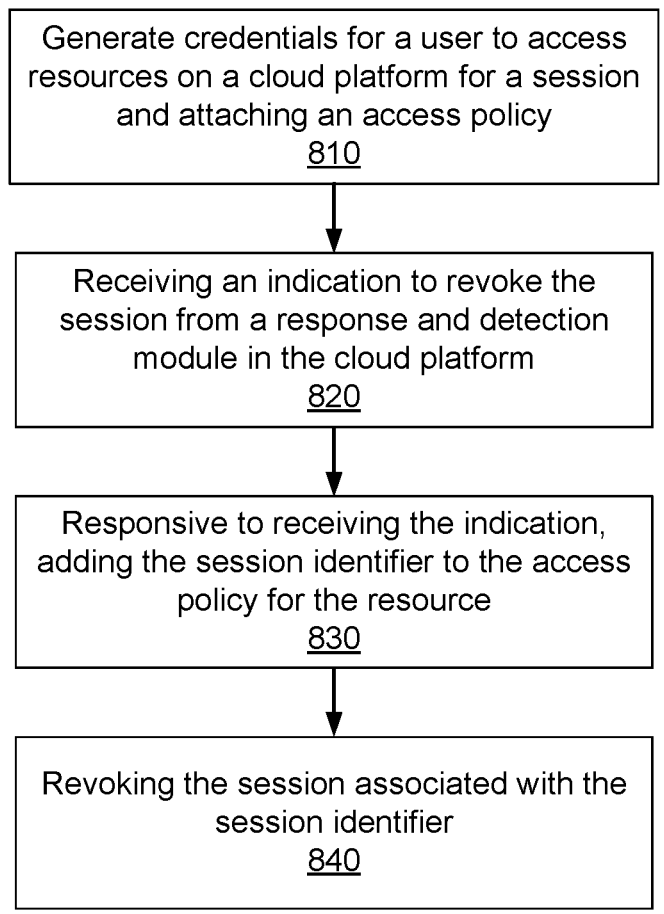
FIG. 8 illustrates a flowchart for a method of revoking a session to access resources of a cloud infrastructure according to an embodiment.

FIG. 8 illustrates a flowchart for a method of revoking a session to access resources of a cloud infrastructure according to an embodiment. In one embodiment, the method illustrated in FIG. 8 is performed by various components of the cloud infrastructure described herein.

An online system generates 810 credentials for a user to access resources on a cloud platform. The credentials are for a particular session and are attached with an access policy for the resource. In one instance, the credentials are also attached with a session identifier uniquely identifying the active session. The online system receives 820 an indication to revoke the session from a response and detection module in the cloud platform. For example, the session may need to be revoked because the credentials are compromised or malicious activity has been detected. Responsive to receiving the indication, the online system adds 830 the session identifier to the access policy for the resource. The online system revokes 840 the particular session associated with the session identifier.

Computer Architecture

Figure 9:
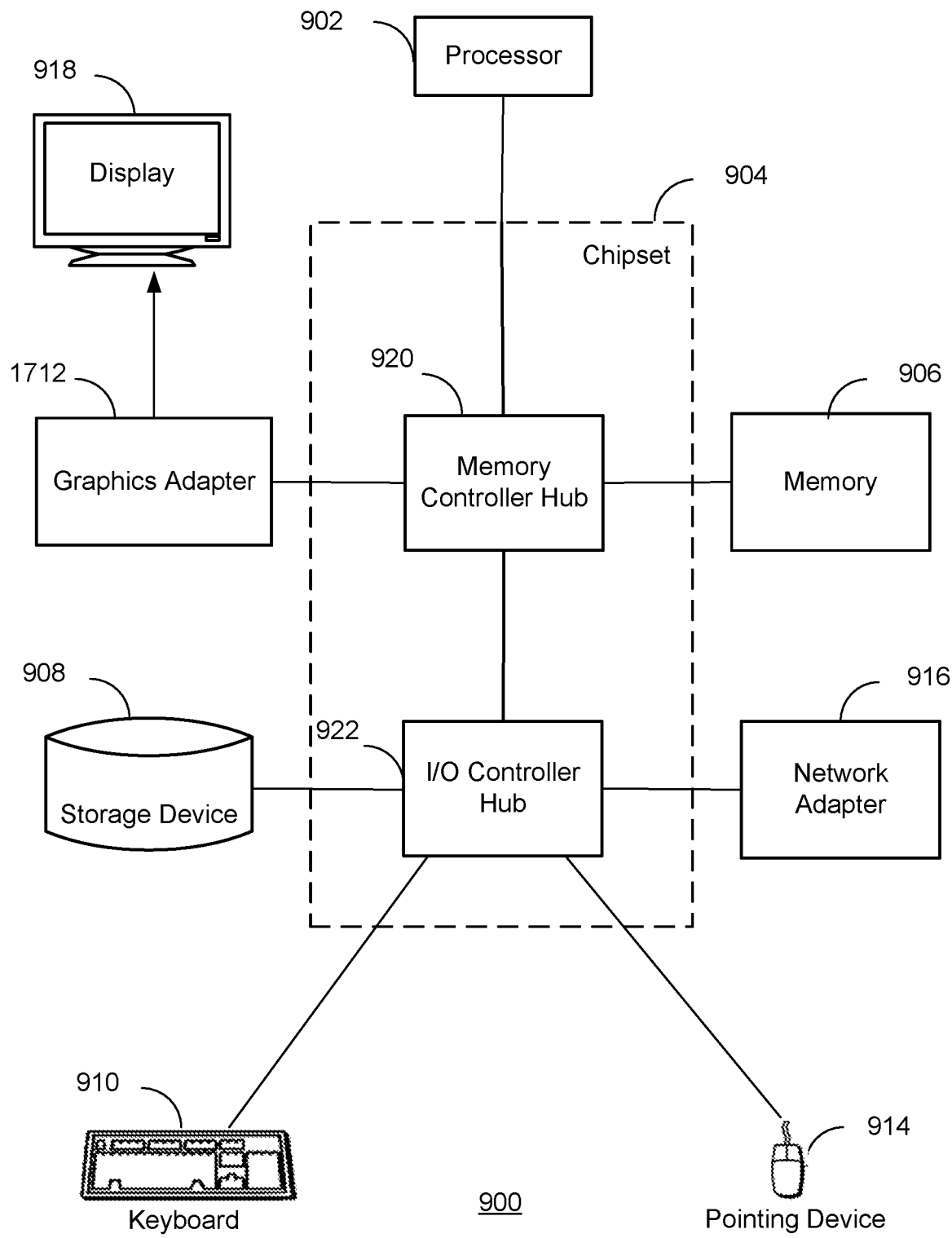
FIG. 9 is a high-level block diagram illustrating a functional view of a typical computer system for use as one of the entities illustrated in the environment 100 of FIG. 1 according to an embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as a multi-tenant system 110 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of a system environment can vary depending upon the embodiment and the processing power used by the entity. For example, a client device may be a mobile phone with limited processing power, a small display 918, and may lack a pointing device 914. A multi-tenant system or a cloud platform, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method, the method comprising:
    configuring on a cloud platform a plurality of datacenters, a datacenter configured based on a declarative specification describing network information that indicates a network boundary of one or more datacenter entities;
    generating session policies for a datacenter, wherein session policies associated with the datacenter describes a set of network restrictions for accessing entities of the datacenter, wherein the set of network restrictions is determined based at least on the network information of the datacenter;
    receiving a request from a user to access an entity of a first datacenter;
    generating credentials for the user and attaching an access policy associated with the first datacenter to the credentials, the access policy including one or more session policies associated with accessing the entity of the first datacenter; and
    responsive to determining that the credentials are used to access the first datacenter from a set of access conditions that match the set of network restrictions in the attached one or more session policies, granting access to the user.

2. The computer implemented method of claim 1, further comprising:
    provisioning networks for the datacenter based at least on the network information from the declarative specification of the datacenter and generating network artifacts from the provisioning,
    wherein the set of network restrictions in the session policies associated with the datacenter are determined also based on the network artifacts generated after provisioning the networks for the datacenter.

3. The computer implemented method of claim 1, wherein the network information for the datacenter specifies:
    a set of virtual private cloud (VPC) networks each encompassing a respective set of entities of the datacenter, and
    one or more access entities from which entities of the datacenter can be accessed from and network properties of the one or more access entities.

4. The computer implemented method of claim 3, wherein the one or more access entities include a bastion host, a public proxy, or a remote access entity, and the network properties specify at least which VPC network the one or more access entities are located in.

5. The computer implemented method of claim 3, wherein the set of network restrictions for accessing the entities of the datacenter are represented by one or a combination of VPC network identifiers, subnet ranges within the set of VPC networks, or source IP address ranges.

6. The computer implemented method of claim 1, wherein the set of network restrictions described in the session policies of a datacenter of a production environment is more restrictive than the set of network restrictions described in the session policies of a datacenter of a development environment.

7. The computer implemented method of claim 1, wherein the request from the user further specifies a role, and the access policy associated with the first datacenter further specifies a role policy that describes permissions of the assumed role.

8. A non-transitory computer readable storage medium for storing instructions that when executed by a computer processor cause the computer processor to perform steps for:

configuring on a cloud platform a plurality of datacenters, a datacenter configured based on a declarative specification describing network information that indicates a network boundary of one or more datacenter entities;

generating session policies for a datacenter, wherein session policies associated with the datacenter describes a set of network restrictions for accessing entities of the datacenter, wherein the set of network restrictions is determined based at least on the network information of the datacenter;

receiving a request from a user to access an entity of a first datacenter;

generating credentials for the user and attaching an access policy associated with the first datacenter to the credentials, the access policy including one or more session policies associated with accessing the entity of the first datacenter; and responsive to determining that the credentials are used to access the first datacenter from a set of access conditions that match the set of network restrictions in the attached one or more session policies, granting access to the user.

9. The non-transitory computer readable storage medium of claim 8, wherein the instructions further cause the computer processor to perform steps for:

provisioning networks for the datacenter based at least on the network information from the declarative specification of the datacenter and generating network artifacts from the provisioning, wherein the set of network restrictions in the session policies associated with the datacenter are determined also based on the network artifacts generated after provisioning the networks for the datacenter.

10. The non-transitory computer readable storage medium of claim 8, wherein the network information for the datacenter specifies:

a set of virtual private cloud (VPC) networks each encompassing a respective set of entities of the datacenter, and one or more access entities from which entities of the datacenter can be accessed from and network properties of the one or more access entities.

11. The non-transitory computer readable storage medium of claim 10, wherein the one or more access entities include a bastion host, a public proxy, or a remote access entity, and the network properties specify at least which VPC network the one or more access entities are located in.

12. The non-transitory computer readable storage medium of claim 10, wherein the set of network restrictions for accessing the entities of the datacenter are represented by one or a combination of VPC network identifiers, subnet ranges within the set of VPC networks, or source IP address ranges.

13. The non-transitory computer readable storage medium of claim 8, wherein the set of network restrictions described in the session policies of a datacenter of a production environment is more restrictive than the set of network restrictions described in the session policies of a datacenter of a development environment.

14. The non-transitory computer readable storage medium of claim 8, wherein the request from the user further specifies a role, and the access policy associated with the first datacenter further specifies a role policy that describes permissions of the assumed role.

15. A computer system, comprising:
one or more computer processors; and
a non-transitory computer-readable storage medium for storing instructions that when executed by the one or more computer processors cause the one or more computer processors to perform steps comprising:

configuring on a cloud platform a plurality of datacenters, a datacenter configured based on a declarative specification describing network information that indicates a network boundary of one or more datacenter entities;

generating session policies for a datacenter, wherein session policies associated with the datacenter describes a set of network restrictions for accessing entities of the datacenter, wherein the set of network restrictions is determined based at least on the network information of the datacenter;

receiving a request from a user to access an entity of a first datacenter;

generating credentials for the user and attaching an access policy associated with the first datacenter to the credentials, the access policy including one or more session policies associated with accessing the entity of the first datacenter; and responsive to determining that the credentials are used to access the first datacenter from a set of access conditions that match the set of network restrictions in the attached one or more session policies, granting access to the user.

16. The system of claim 15, wherein the instructions further cause the computer processor to perform steps for:

provisioning networks for the datacenter based at least on the network information from the declarative specification of the datacenter and generating network artifacts from the provisioning, wherein the set of network restrictions in the session policies associated with the datacenter are determined also based on the network artifacts generated after provisioning the networks for the datacenter.

17. The system of claim 15, wherein the network information for the datacenter specifies:

a set of virtual private cloud (VPC) networks each encompassing a respective set of entities of the datacenter, and one or more access entities from which entities of the datacenter can be accessed from and network properties of the one or more access entities.

18. The system of claim 17, wherein the one or more access entities include a bastion host, a public proxy, or a remote access entity, and the network properties specify at least which VPC network the one or more access entities are located in.

19. The system of claim 17, wherein the set of network restrictions for accessing the entities of the datacenter are represented by one or a combination of VPC network identifiers, subnet ranges within the set of VPC networks, or source IP address ranges.

20. The system of claim 15, wherein the set of network restrictions described in the session policies of a datacenter of a production environment is more restrictive than the set of network restrictions described in the session policies of a datacenter of a development environment.

\* \* \* \* \*